Figure 1:
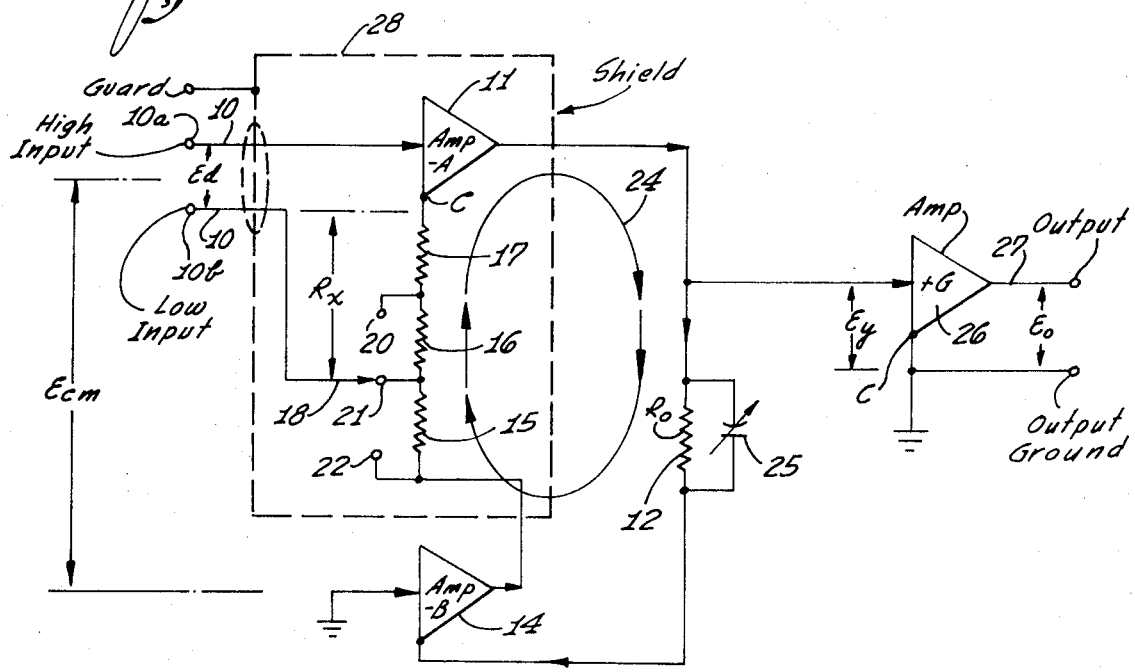

United States Patent

[11] 3,594,654

| [72] | Inventor | Ralph D. Hasenbalg |
| | | Thousand Oaks, Calif. |
| [21] | Appl. No. | 759,588 |
| [22] | Filed | Sept. 13, 1968 |
| [45] | Patented | July 20, 1971 |
| [73] | Assignee | Delaware SDS, Inc. |
| | | El Segundo, Calif. |

[54] DIRECT-COUPLED DIFFERENTIAL AMPLIFIER
9 Claims, 2 Drawing Figs.

[52] U.S. Cl. .................................................. 330/69,
330/9, 330/85
[51] Int. Cl. ....................................................... H03f 1/00,
H03f 3/68
[50] Field of Search ........................................... 330/30 D,
69, 85

[56] References Cited
UNITED STATES PATENTS

| 3,196,364 | 7/1965 | Latham, Jr. | 330/69 X |
| 3,209,277 | 9/1965 | Burwen | 330/69 |
| 3,258,709 | 6/1966 | Ely et al. | 330/69 |
| 3,277,385 | 10/1966 | Matsumoto | 330/30 X |
| 3,480,872 | 11/1969 | Breuer | 330/69 X |
| 3,423,689 | 1/1969 | Miller et al. | 330/69 |
| 3,448,398 | 6/1969 | Ball et al. | 330/69 |

Primary Examiner—Nathan Kaufman
Attorney—Smyth, Roston & Pavitt

ABSTRACT: The differential amplifier system as disclosed includes a loop of high-gain amplifier, resistor, medium gain amplifier and another resistor, using output and reference terminals of the amplifier for making the connections. Input is applied to the input of the high-gain amplifier and across the resistor connected to the reference terminal of the latter, the input of the other amplifier is grounded. The output is taken from across the other resistor.

INVENTOR:
Ralph D. Hasenbalg

By Smyth, Roston & Pavitt
ATTORNEYS

DIRECT-COUPLED DIFFERENTIAL AMPLIFIER

This invention relates, generally, to differential amplifiers, and particularly relates to a direct current differential amplifier system.

Large numbers of differential amplifiers are used for data acquisition. For example, they are needed to amplify the signal developed by a transducer such as a strain gage or thermocouple or by a geophone which picks up seismic signals. Frequently the signals must be transmitted from the place of their development over long cables to the acquisition system proper. These cases arise particularly where certain tests are performed in places inaccessible for the acquisition system such as in wind tunnels or rocket test stands. Interfering voltages which may be of the order of volts may be developed in these cables between transducer and acquisition system while the measuring signal developed by the transducer may be in the millivolt region and hence orders of magnitude smaller. The interference-type signal is usually a voltage between the cables and ground and is generally referred to as a common-mode signal because it is common to both of the two cables, particularly at their ends where connecting to acquisition system. The measuring signal carried by the cables is referred to more generally as the differential-mode signal and is the desired input signal.

For the purpose of amplifying such differential-mode signals, differential amplifiers have been developed. A differential amplifier may be defined as having an output signal proportional to the difference between two input signals, but substantially no output signal should be developed for the common-mode signal which may exist between both input terminals and ground.

The measuring input signal includes low frequency components as well as a d-c component. Hence a transformer-coupled input circuit cannot be used. Instead a so-called floating (differential) input is necessary where neither one of the input terminals is grounded, and the amplifier system must be capable of faithfully amplifying the differential-mode signal while substantially rejecting common-mode signals which may be static or dynamic. For this reason, it is common practice to construct differential amplifier systems from several differential amplifier units to completely eliminate the common-mode signal. Furthermore, due to the necessity to provide floating inputs, a floating power supply is needed, i.e., the common-mode signal must not be introduced into the system by way of the power supply. In short, conventional DC differential amplifiers are expensive, relatively large, and subject to noise and drift.

In many data acquisition systems a large number of transducers may have to be connected to an analog or digital computer. For each transducer a differential amplifier is needed, and therefore even small savings in cost, size or weight per amplifier are significant.

The DC differential amplifier system of the present invention does not require individual differential amplifiers. In other words, the amplifiers of the system need not have floating, double-ended inputs and outputs but may, for example, have a single-ended output.

It is accordingly an object of the present invention to provide a differential amplifier system which does not require individual differential amplifiers and hence is of reduced size, less expensive and less subject to noise and drift.

Another object of the present invention is to provide a DC differential amplifier system which requires only a single low-level amplifier, thus further reducing the complexity and cost of the system.

A further object of the present invention is to provide a differential amplifier system of the type referred to, which may be designed to have tolerance against changes of the input impedance over several orders of magnitude.

Still another object of the present invention is to provide a differential amplifier system having an adjustable loop gain, but which may be arranged so that changes of the input resistance will not affect the overall output gain of the system.

A differential direct current amplifier, in accordance with the present invention, comprises two amplifiers and two resistors connected in a closed loop to permit the flow of direct current therethrough. Each amplifier can be of the single-input type, having, in addition, reference and output terminals and being operated to have a current node at the respective input terminal. The loop is established by connecting the respective outputs of the amplifiers to the reference terminals of the respective other amplifier, using the resistors for each of the connections. The input terminal of that second amplifier is grounded.

A differential-mode input voltage is supplied between the input of a first one of the amplifiers and an intermediate point on the resistor connected between the reference terminal of the first amplifier, and the output of the other second amplifier. The resistance effective between the intermediate point and the reference terminal of the first amplifier in relation to the other resistor generally determines (the inverse of) the loop gain of the system. The gain may readily be changed by a tap switch changing the amount of resistance between the reference terminal of the first amplifier and the signal input terminal connected to the tap switch. Adjustment includes the possibility of applying the differential mode signal input directly between to the output of the second amplifier (having its floating input terminal grounded), and the input of the first amplifier.

There may also be provided an output amplifier which serves as a buffer amplifier. It has ground referenced input and output terminals and simply isolates the closed loop which essentially comprises the differential amplifier system, from the output load.

Only the first amplifier must be a low-level signal amplifier. This reduces the cost and complexity of the system. Neither of the amplifiers by itself is a differential amplifier because both amplifiers may have both single-ended input and output.

Figure 2:
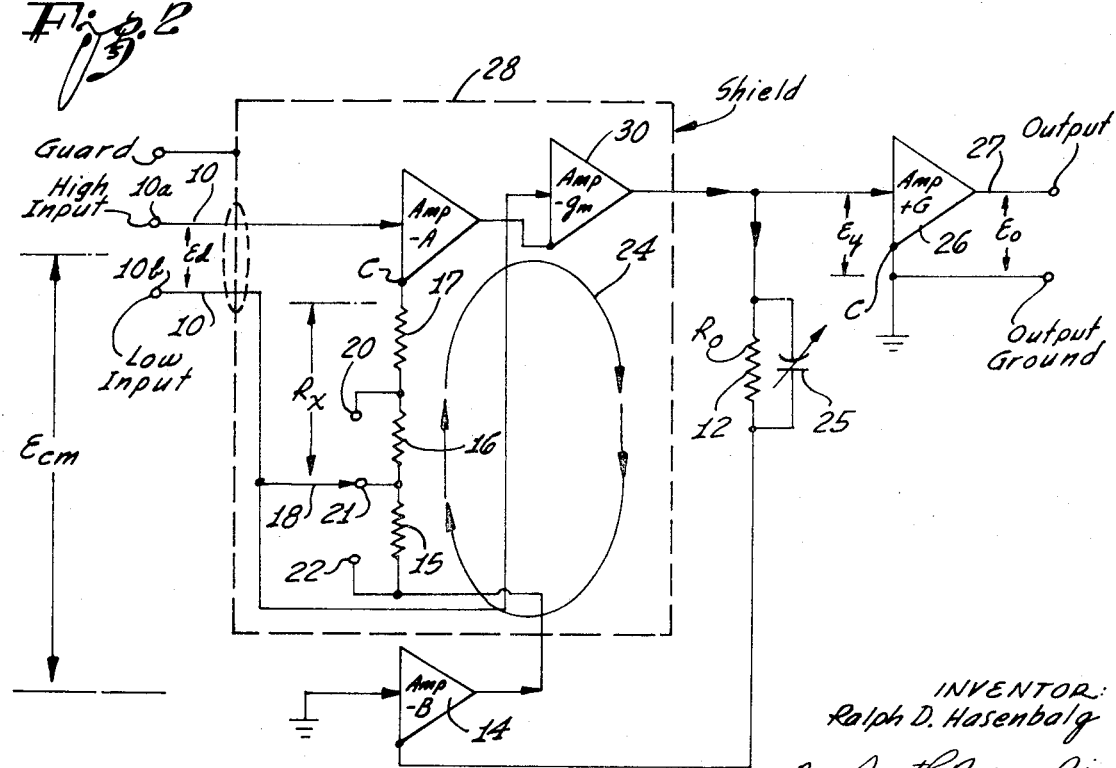

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a block diagram of a DC differential amplifier system embodying the present invention; and FIG. 2 is a block diagram of a modified differential amplifier system, wherein the overall gain is made independent of loop gain variations.

The amplifier system of FIG. 1 is a DC differential amplifier system and has a pair 10 of input terminals 10a and 10b. As clearly shown, the input terminals are floating with respect to ground. In other words, the input terminals 10 carry a differential-mode signal $E_d$ while a common-mode signal $E_{cm}$ may exist between each of the input terminals and ground.

In accordance with the invention there is provided a closed current loop permitting the flow of direct current therethrough. This loop includes an amplifier 11, a resistor 12 connected between the output of amplifier 11 and the reference terminal of a second amplifier 14, and a plurality of resistors 15, 16, 17 connected in series and between the output of amplifier 14 and the reference terminal of amplifier 11.

Input terminal 10a is connected to the input of the amplifier 11, input terminal 10b may be connected by a tap switch 18 to any one of a plurality of terminals such as 20, 21, 22 connected respectively to the junction between resistors 17, 16; 16, 15; and resistor 15 and amplifier 14. Accordingly, more or less resistance can be switched in series with the input terminals 10 and the reference terminal of the amplifier 11. The resistance effectively connected between tap 18 and the reference terminal of amplifier 11 will in the following be called $R_x$ and the voltage drop across $R_x$ will be $E_x$. In the illustrated position, $R_x$ is equal to the sum of the resistances of resistors 16 and 17. A direct current is permitted to flow as shown by the looped arrow 24, say from amplifier 11 through resistor 12, amplifier 14, resistors 15, 16, 17 and back to amplifier 11. It will be understood that the direction of current flow depends not only on the convention but also on the polarity of the input signal at the input terminals 10.

A capacitor 25 may be connected across the resistor 12. This determines the bandwidth of the amplifier system. The capacitor may be made adjustable as shown to permit adjustment of the passband of the system.

Output amplifier 26 may serve as a buffer amplifier. One of its input terminals is connected to the junction point between amplifier 11 and resistor 12. Thus, the amplifier is effectively connected across the resistor 12. It will be noted that the amplifier 26 has a grounded reference terminal for both input and output circuits, and it has single-ended signal input and output terminals. In other words, after the low-level differential-mode signal has been sufficiently amplified and the common-mode signal rejected, there is no longer a need for floating amplifiers.

The amplifier 11 has a floating single-ended input, a floating, single-ended output and a floating reference terminal common to the input and output circuits. Hence, it is not a differential amplifier by itself. The amplifier 11 is the only low-level, signal amplifier of the system. Amplifier 11 is an operational amplifier with a current node at its signal input for essentially zero current flow DC at its signal input terminal. In order to minimize those errors which directly affect the precision of performance, amplifier 11 should have certain input characteristics. Thus, it should have a negligible offset voltage, where the term "offset voltage" refers to the difference between a desired and the actual value of the voltage. This input offset voltage is referred to the minimum full scale differential voltage $E_d$ existing at the input terminals 10. Similarly, the amplifier should have a current offset so that a negligible offset voltage will be generated with a maximum expected differential source impedance, that is, the impedance at the input terminals 10. Further, in order to insure a negligible error voltage the amplifier 11 should have a high gain. The gain has been indicated in the drawing as $-A$ to indicate that the polarity of the output signal is reversed with respect to that of the input signal. It should, however, be pointed out that the gain of the amplifier 11 does not determine the closed loop gain.

Since the amplifier 11 has both a floating input and output, it will be apparent that the amplifier must be energized by means of a floating power supply. In other words, the power supply must be floating with respect to ground or else the amplifier will be grounded.

It will be apparent from what has been said before that the amplifier 14 is not a low-level signal amplifier, but it is an operational amplifier with zero current at its grounded input terminal. It also has a floating, single-ended output and a floating reference terminal common to its input and output circuits. It requires a medium gain shown in the drawing as $-B$ to indicate that there is a phase reversal between input and output signals. The amplifier 14 should also have a negligible offset voltage when compared to the full scale voltage $E_y$ existing at the input of amplifier 26. Similarly the current offset should be such that a negligible offset voltage is developed with the maximum expected resistance in series with the differential input lead connected to the resistor 12 and compared to the minimum full-scale input differential voltage $E_d$ existing at input terminals 10. Also the gain should be moderate to insure a negligible error voltage compared to the full scale input voltage $E_y$ to the amplifier 26.

Even though the amplifier 14 has one grounded input terminal, it still has floating reference and output terminals. Therefore it must also be operated from a floating power supply.

As stated above, the amplifier 26 serves as a buffer amplifier to isolate the output load from the gain resistor 12. To this end the amplifier 26 must have a high input impedance to provide a negligible load compared with that of the output resistor 12. It may also have a low output impedance to make the output signal independent of the output current. It should also have a negligible voltage offset compared to the full scale input voltage $E_y$ of the amplifier. The current offset should be such that a negligible voltage is developed with the maximum expected resistance in series with the differential input. This negligible voltage is to be referred to the minimum full-scale input differential voltage $E_d$ appearing at the input terminals 10. The gain of buffer amplifier 26 is $+G$ to show that there is no polarity reversal of the signal between input and output.

A guard shield such as shown by dotted lines 28 may be provided to reduce the capacitance from the input circuits to ground. This also improves the dynamic common-mode rejection of the amplifier system. As shown, the shield 28 may include the input leads 10, amplifier 11 and resistors 15 through 17. In other words, the shield should enclose all components that would cause common-mode current in the input leads 10.

The resistors 12 and 15 through 17 determine the differential gain of the amplifier. Therefore they must be stable, free of drift, and accurate.

In order to understand the operation of the system, the desired result has to be stated first. The output voltage $E$ between output terminal 27 and ground has to have a fixed, functional relation to the differential mode input voltage $E_d$ to the exclusion of common mode interference as represented by voltage $E_{cm}$. Inasmuch as in the normal case only linear gains are required, $E_o$ must be proportional to $E_d$, and the proportionality factor must not include $E_{cm}$, nor must there be a zero-offset which includes $E_{cm}$. Since amplifier 26 has a grounded reference terminal and serves merely as a buffer, its input voltage $E_y$, taken between ground and the common junction of amplifier 11, resistor 12 and amplifier 26 must also be proportional to $E_d$ to the exclusion of $E_{cm}$ in the relation. $E_o$ then results from $E_y$ by the relation $E_o = G E_y$ where $G$ is the gain of amplifier 26.

$E_y$ is equal to the voltage across resistor 12 plus the voltage between ground and the reference terminal of amplifier 14, which is the effective input voltage for amplifier 14. The latter component is essentially zero, i.e., negligibly small in relation to the voltage drop across resistor 12, because amplifier 14 has a medium gain, while the voltage drop across resistor 12 is essentially the output of high gain amplifier 11. Inasmuch as resistor 12 is presumed to be linear and ohmic, the voltage drop thereacross is proportional to the current flow through resistor 12. Thus, $E_y = R_o I_{12}$ ($E_o = G R_o I_{12}$). The elements 11, 12, 14, 15, 16 and 17 establish a closed loop. Current $I_{12}$ flows through resistors 15, 16 and 17, including the combination which forms $R_x$ as effective between terminal 10b and the reference terminal of amplifier 11. The current through resistor(s) $R_x$ is denoted $I_x$. Thus, in order to show that the voltage $E_x$ across the combination of resistors 15, 16, 17 forming $R_x$ is proportional to current $I_{12}$ (with no zero offset) it must be shown that $I_x = I_{12}$, i.e., that no other current flows through resistors 15, 16 and 17.

Assuming for the moment that it can be shown, that $I_{12} = I_x$, voltage drop $E_x$ is then proportional to $I_{12}$. Voltage $E_x$ in turn is equal to the differential voltage $E_d$ plus the voltage between signal input and reference of amplifier 11. The latter component is kept negligibly small in relation to the former, because amplifier 11 has a high gain, so that $E_d = E_x$. Thus, $E_o = G E_y = G R_o I_{12} = G R_o I_x = G R_o/R_x E_x = G \cdot R_o/R_x E_d$, q.e.d.

It will be appreciated now why amplifier 11 has to have a high gain, while a lesser gain suffices for amplifier 14. The input voltage between signal input and reference terminals must be negligibly small in relation to the unamplified signal voltage $E_d$ for the relation to be true. This requires a rather high gain for amplifier 11 in order to convert the small input between signal and reference terminals to a useful output. The input voltage between signal input and reference terminals of amplifier 14 merely has to be negligibly small in relation to the relatively high voltage drop across resistor 12. This permits a smaller gain for amplifier 14 than for amplifier 11.

We now have to prove that in fact $I_{12} = I_x$. Current can be supplied to resistors 15, 16 and 17 through the amplifiers 11 and 14 as well as tap 18. Particularly, it is to be considered that aside from participating as components in the main loop as described, resistors 15 to 17 individually form components of one of the following two circuits depending on the position of tap 18. In the illustrated position, one circuit is defined by the cable leading to terminal 10b, resistor 15, amplifier 14, ground, and the parasitic source which has caused voltage $E_{cm}$ to be introduced into the system. That voltage is here effective between ground as connected to the signal input of amplifier 14, and the one cable leading to signal terminal 10b. By operation of amplifier 14, the current at its grounded signal input is kept zero (except for negligible leakage current). Thus, this circuit does not drive any current into the junction of terminal 10b and resistor 15 (tap 18).

The second circuit is defined as follows: signal source, cable leading to terminal 10a, signal input of amplifier 11, reference terminal of amplifier 11, resistors 16 and 17, terminal 10b, and cable back to signal for signal $E_d$. By operation of amplifier 11, the current at its signal input is maintained zero (or at negligible small levels). Thus, current does not circulate in this second circuit; particularly, current is not driven into the junction of terminal 10b and resistor 16 (18).

It follows from the foregoing that no current flows to tap 18, because current does not flow in any of the two circuits considered, and that was found to be true because current does not flow in any of the input signal terminals of amplifiers 11 and 14. Looking at the circuit, one can readily see that the current which flows across resistors 15, 16 and 17 is the current flowing at the output of amplifier 11 and the reference of amplifier 14; there is no other source. Thus, resistors 15, 16 and 17 receive only the current circulating in the main loop and that is $I_{12}$, i.e., $I_{12}$ is, in fact, equal to $I_x$, and $E_o = G R_o/R_x$ $E_d$; $E_{cm}$ does not appear in the relation.

The considerations above are precisely valid only for DC and low frequency signal components. For higher signal frequencies, or high frequency components, corresponding AC components are partially capacitively coupled to ground, as between the output of amplifier 14 and the grounded input thereof. Thus, the coupled-out components bypass the $R_x$ portion of the DC closed current loop as described and flow through the source impedance. For such high frequency signals the system gain is not $R_o/R_x$ but has to be modified by the source impedance to the extent of the bypass. Moreover, the resulting gain change may cause instability in the operation of the amplifier 11. This problem can be overcome by making amplifier 11 an 14 of the current output-type for high frequencies, the output of amplifier 14 will then have negligible capacity to ground and AC current is not coupled out of the loop to ground. In that case the input impedance may vary between zero and many kilohms without causing systems gain changes. However, when amplifier 11 is of the current type, a stability problem arises.

When the tap switch 18 is moved from one position to another, obviously the resistance of $R_x$ will change, which, in turn, normally changes the closed loop gain for amplifier 11; the loop in this case being the feedback path provided by elements 12 and 14 to 17 between output and reference of amplifier 11 (assumed to be of the current output type). That gain is, of course, frequency-dependent and if the phase shift is 180° or more at the frequency where the closed loop gain drops below 1 (because of phase shift in the amplifier and elsewhere), instability occurs. As this loop gain normally varies directly with $R_x$, when the amplifier 11 is made a current output amplifier for solving the input impedance problem, the circuit may be unstable for some particular adjustments of $R_x$.

To overcome this problem, the circuit of FIG. 2 may be used with advantage. This circuit uses an additional amplifier 30, which is a current output amplifier to meet the source impedance problem while amplifier 11 is of the voltage output type. Amplifier 30 has floating input and reference terminals and a single-ended, floating output. The reference terminal is connected to the output lead from amplifier 11, while the input terminal is connected to input terminal 10b. The single output terminal is connected to register 12 and to the input of amplifier 26 as shown. Accordingly, the feedback loop for amplifier 11 is governed by the voltage between the input and reference terminals of amplifier 30 and the voltage $E_x$ across the effective resistor $R_x$. As long as the voltage between input and reference terminals of amplifier 30 remains smaller than the voltage drop $E_x$ across resistance $R_x$, amplifier 11 will necessarily remain stable, regardless of the phase between the two voltages.

Since $R_x$ is never zero (infinite gain), the gain $-g_m$ of amplifier 30 can be selected suitably so that the voltage between its input and reference terminals remains below the voltage corresponding to the lowest adjustment of resistance $R_x$. It was found that the gain of amplifier 30 does not have to be very high, a gain comparable in magnitude with the gain of amplifier 14 suffices.

The amplifier 30 has gain of $-g_m$ to indicate that it reverses the signal polarity. The $g_m$ indicates a transconductance, that is, the ratio of the output current over the input voltage. The current flow (DC wise) at the input terminal of amplifier 30 is, of course, zero, so that tap 18 (to which it is connected) remains currentless. It can thus be seen that resistor $R_x$ may be varied without affecting the loop gain for amplifier 11, i.e., without affecting the stability of the system.

For practical reasons, the amplifier 30 may be made part of the amplifier 11. This will save a separate floating power supply because the same supply may be used for both amplifiers 11 and 30. Since the amplifier 30 has a floating input and floating output, it preferably also is enclosed by the shield 28. It will be noted that again the amplifier 30 has a single-ended output.

It will be appreciated that the amplifier system of FIGS. 1 and 2 is a DC amplifier. Hence temperature stabilization must be provided in any conventional manner. To this end the amplifier may be chopper stabilized, as is well known.

There has thus been disclosed a DC differential amplifier system which does not require any differential amplifiers. Only a single low-level amplifier stage is needed, which reduces size and cost as well as the complexity of the system. By a slight change in design the gain is adjustable without affecting the overall loop gain of the system. On the other hand, the amplifier may tolerate large changes of the input impedance without instability. By means of a switch, the input gain may be varied and this switch carries only error current.

The novel features that are considered characteristic of this invention are set forth with particularity in the appended claims. The invention itself, however, both as to its organization and method of operation, as well as additional objects and advantages thereof, will best be understood from the description when read in connection with the accompanying drawings, in which:

I claim:

1. A system for amplifying the differential mode voltage between a pair of terminals to the exclusion of a common mode voltage effective between the terminals and a source of reference potential such as ground, mass or the like, comprising:

a high-gain operational amplifier having floating input-output and reference terminals, the single-ended input terminal of the amplifier being connected to one of the terminals of the pair;

first resistive means having one end connected to the reference terminal for coupling the other one of the pair of terminals to the reference terminal;

second resistive means having one end connected to the output terminal of the amplifier; and means connected between the respective other ends of the first and second resistive means, further connected to the source of reference potential for applying the common mode voltage between the other end of said first resistive means and said second resistive means while preventing current flow between the source of reference potential and the first and second resistive means.

2. A system as set forth in claim 1, including a second amplifier having floating input, output and reference terminals for connecting, through its reference and output terminals, the output terminal of the high gain amplifier to the second resistive means, the second amplifier having its input terminal connected to said other one of the pair of terminals.

3. A system as set forth in claim 2, one of the amplifiers being of the current output type.

4. A system as set forth in claim 1, the means for applying being a medium gain amplifier having floating input, output and reference terminals, the reference terminals being connected to the source of reference potentials, and the input and output terminals being respectively connected to the second and first resistive means.

5. An amplifier system for amplifying the differential mode voltage between a first and a second terminal, to the exclusion of a common mode voltage effective as between the terminals and a source of reference potential such as ground, comprising:

first and second distinct operational amplifiers each having floating output and reference terminals and each constructed for operating essentially with a current node in the respective input terminals, so that the current in the output terminal is essentially equal to current in the reference terminals;

first and second resistive means connecting respectively the output terminals of the first and second amplifiers to the reference terminals of the second and first amplifiers to establish a closed loop;

means connecting the first terminal to the input terminal of the first amplifier, the input terminal of the first amplifier also floating relative to ground, and connecting the second terminal to the first resistive means so that at least a portion of the first resistive means is connected between the second terminal and the floating reference terminal of the first amplifier;

means for connecting said source of reference potential to the input terminal of the second amplifier; and circuit means connected for deriving an output from across the second resistive means relative to the reference terminal of the second amplifier.

6. An amplifier system as in claim 5, wherein a filter is connected across the second resistive means.

7. An amplifier as in claim 5, wherein the first resistive means has plural connecting points for selective connection to the second terminal, and wherein a third operational amplifier having floating reference and output terminals is interposed between the output of the first amplifier and the second resistive means, and having its input connected to the second input terminal, to render the loop gain of the amplifier system substantially independent of the connection of the second input terminal to the first resistance means.

8. An amplifier system as in claim 7, one of the first and third amplifier being of the current type.

9. An amplifier system as in claim 5, the first amplifier having high gain, the second amplifier having medium gain.